(12) United States Patent
Kotzin (10) Patent No.: US 8,443,115 B2
(45) Date of Patent: May 14, 2013

(54) METHOD AND SYSTEM FOR MANAGING ACCESS TO PRESENCE ATTRIBUTE INFORMATION

(75) Inventor: Michael D. Kotzin, Buffalo Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1967 days.

(21) Appl. No.: 10/749,321

(22) Filed: Dec. 31, 2003

(65) Prior Publication Data

US 2005/0144333 A1 Jun. 30, 2005

(51) Int. Cl.
*G06F 3/00* (2006.01)
*H04L 9/32* (2006.01)

(52) U.S. Cl.
USPC ............................................. 710/15; 713/178

(58) Field of Classification Search .............. 710/15, 710/19, 36, 107; 713/178
See application file for complete search history.

(56) References Cited

U.S. PATENT DOCUMENTS

| | | | |
|---|---|---|---|
| 5,552,776 A * | 9/1996 | Wade et al. | 340/5.74 |
| 5,922,073 A | 7/1999 | Shimada | |
| 6,433,704 B1 * | 8/2002 | Fushiki et al. | 340/905 |
| 6,684,279 B1 * | 1/2004 | Kruse et al. | 710/241 |
| 6,957,217 B2 * | 10/2005 | Raverdy et al. | 707/9 |
| 2001/0042126 A1 | 11/2001 | Wong et al. | |
| 2002/0068573 A1 | 6/2002 | Raverdy et al. | |
| 2003/0065788 A1 | 4/2003 | Salomaki | |

FOREIGN PATENT DOCUMENTS

| | | |
|---|---|---|
| KR | 2003-0096373 A | 12/2003 |
| WO | 02093959 A1 | 11/2002 |

OTHER PUBLICATIONS

Patent Office of the People's Republic of China: Notification of the First Office Action, Jul. 6, 2007.
Gajparia A S et al.: "Using constraints to protect personal location information", Vehicular Technology Conference, 2003, VTC 2003—Fall 2003 IEEE 58th Orlando, FL., USA Oct. 6-9, 2003; [IEEE Vehicular Technology Conference], Piscataway, NJ, USA, IEEE, US vol. 3, Oct. 6, 2003, pp. 2112-2116.
Chabot, Pedro: Supplementary European Search Report, Munich, Sep. 19, 2008.
Patent Cooperation Treaty, International Search Report and Written Opinion of the International Searching Authority for International Application No. PCT/US04/42834, Jan. 13, 2006 10 pages.
KIPO's Notice F Preliminary Rejection (English Translation), Results of KIPO Examination—Summary, May 20, 2011, all pages.

* cited by examiner

*Primary Examiner* — Chun-Kuan Lee (57) ABSTRACT

A presence attribute information server and manager application, and corresponding method is provided for managing access to presence attribute information. In addition to the presence attribute information entries, access authorization entries associated with at least some of the presence attribute information entries are provided which define conditions in which access to the presence attribute information is authorized. Generally, the defined conditions can include temporal and/or spatial requirements associated with either the user requesting the presence attribute information or the person/item associated with the presence attribute information, for purposes of establishing authorization to access the presence attribute information.

22 Claims, 5 Drawing Sheets

METHOD AND SYSTEM FOR MANAGING ACCESS TO PRESENCE ATTRIBUTE INFORMATION

FIELD OF THE INVENTION

The present invention relates generally to the management of a user's presence attributes, and more particularly, to the management of the access to the presence attribute information.

BACKGROUND OF THE INVENTION

Presence attributes are presently used as a way to define, manage and convey a user's relationship relative to a communication network. Present definitions allow for several different types of information to be managed, including a user's geographical location, a user's on-line status and a user's availability. Presence attributes have even been discussed as a means to manage, record and convey a user's present mood. In general, presence attributes have the potential to convey a fair amount of personal information, which is linked to a particular user's current situation or status.

Presence information has historically been used in instant messaging type applications. In at least some instances, an instant messaging system will allow a buddy list to be maintained, which can alert a user as to the on-line status of a predefined subset of users, even when a user is not actively attempting to communicate with an individual on the buddy list. A user's geographic information, in addition to a user's on-line status, may be further beneficial. A user may be able to determine that an individual they want to talk to is only a short distance away, making it equally convenient to discuss a matter in person.

Location information may also be useful in dispatching emergency personnel to the location of an emergency, like an accident, as it may help to identify which personnel are already located within the proximity of the scene of an accident and/or the location information may make it possible to direct the personnel to the location of a person in need of assistance. Alternatively, a courier service may be able to better schedule a package pick-up, if it knows where its drivers are presently located. Sometimes the availability of accurate presence attribute information may be sufficient to satisfy another user's inquiry. For example, the presence attribute defining a user's present geographical location, may answer another user's question, as to whether an individual has already left work for the day, and/or whether they are on their way home.

While in some instances the ability to share and obtain this information can be very useful and/or convenient, in other instances it can be a serious trespass of a user's privacy interest. In some instances the information could be used in a manner that is contrary to the user's interest. Because of this it may be desirable to limit accessibility to this information. In many instances, a user may err on the side of caution, and overly restrict access to this type of information, and in the process forgo some of the intended useful benefits, which can come from sharing this type of information. In other instances a user may fail to take prudent measures to protect one's self.

In some instances, a decision to overly restrict access to presence information may come from an inability to conveniently and/or flexibly manage another person's access to the presence information. In other instances, there may be no provision for tailoring accessibility, which properly limits or manages the access to only those instances in which the sharing of access information would be mutually beneficial. For example, it may be mutually beneficial for an employer to be able to track an employee's location during business hours, however an employee may not want the employer to have the same ability to track the employee's location during periods of time that an employee is away from work. Furthermore, the potential variability of an employee's work schedule can make implementation of a system for managing access to presence information in these circumstances, less than straight forward. Consequently, an ability to more flexibly define and tailor the accessibility of presence information would be beneficial, and could help to avoid various privacy concerns associated with managing and making available presence information.

The present inventor has recognized that an ability to define the circumstances in which access to presence information is authorized would be beneficial. It would be further beneficial if various types of conditions can be used to provide a system for providing access to presence information that is better able to be tailored to more circumstances, in which the balance between the benefits of access and the concerns relative to privacy can be addressed.

SUMMARY OF THE INVENTION

The present invention provides a presence attribute information server for managing a validity period in association with a presence attribute. The presence attribute information server includes a processor, an interface unit, and a storage unit. The interface unit is coupled to the processor, and includes a network interface for receiving and transmitting user presence attribute information. The storage unit is coupled to the interface unit and the processor, and includes presence attribute information and associated access authorization information organized and arranged as one or more entries in a data structure. The access authorization entries are each associated with corresponding presence attribute information entries. Each presence attribute information entry has a presence attribute value field corresponding to one or more types of presence attributes. Each access authorization information entry has a user field identifying one or more users and one or more access condition entries, which define the conditions which need to be met in order to allow the identified user to have access to the corresponding presence attribute information.

In at least one embodiment, at least one of the one or more access condition entries includes a predetermined period of time to be matched as a condition of determining authorization to access the presence attribute information.

In at least a further embodiment, at least one of the one or more access condition entries includes a proximity relative to a predetermined location to be matched as a condition of determining authorization to access the presence attribute information.

In a still further embodiment the presence attribute information is maintained as an application being executed as part of a user device, where the interface unit additionally includes a data input device for receiving user attribute information from the user.

The present invention further provides a method for managing the access to presence attribute information. The method includes receiving a request for presence information. The user requesting the presence information is then identified. A determination is then made as to whether the user requesting the information is authorized to have access to the requested presence information, which includes receiving any conditions relative to the requesting user, which is associated with receiving access to the information, and determining whether the received conditions associated with receiving access have been met. If the user has met the conditions associated with receiving access, the presence information is then forwarded to the requesting user.

These and other features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
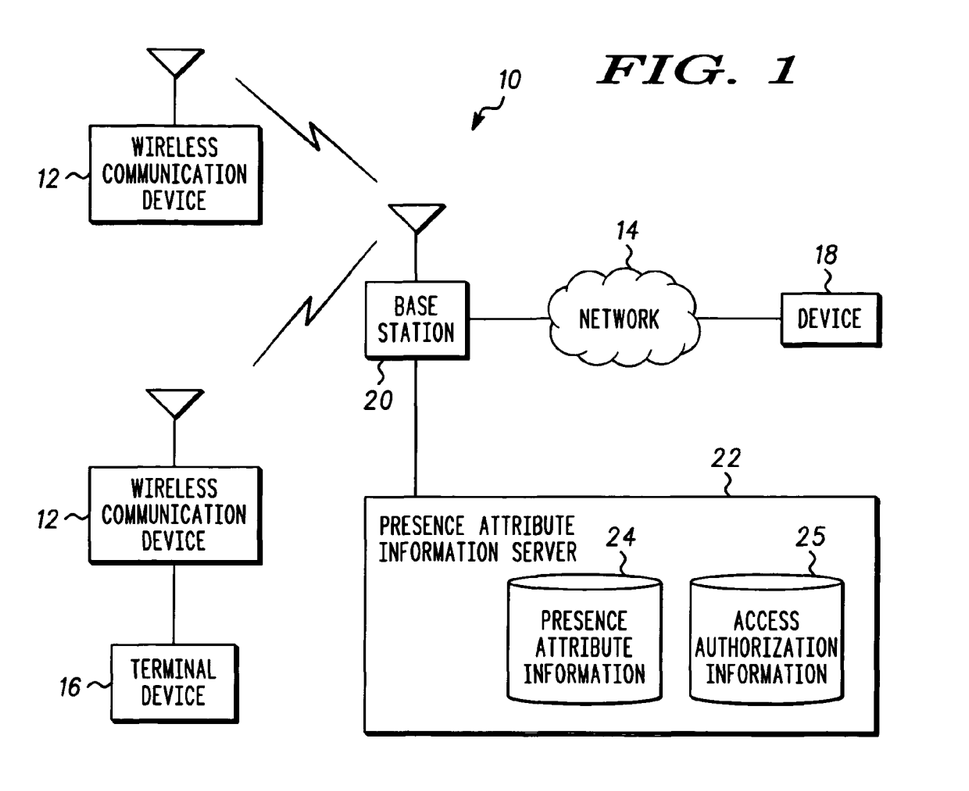
FIG. 1 is a block diagram of an exemplary communication network.

FIG. 1 illustrates a block diagram of an exemplary communication network 10 including a pair of wireless communication devices 12, which separately communicate within the network. The wireless communication devices 12 can be any suitable device capable of communicating over a wireless connection within a network, for example one or more of the wireless communication devices could be a wireless radio frequency telephone, such as a cellular telephone. Alternatively, the wireless communication device could incorporate a wireless LAN connection, a short range radio transceiver, such as a Bluetooth transceiver, an infra-red communication transceiver, or other similar communication device not constrained by a physical wired connection.

The wireless devices 12 in some instances may be self contained and operate independently. In other instances, the wireless communication device will couple to a terminal device 16, and will facilitate the terminal device communicating with the network 14. At least some wireless communication devices 12 will couple to the network 14 via a base station 20, or other type of wireless transceiver, which is physically coupled to the network 14 via a wired connection.

The network 14 may include any type of network that is capable of sending and receiving communication signals. In at least one embodiment, the network 14 includes a wireless communication network. The network 14 may also include or be in communication with a data network, such as the Internet, an Intranet, a local area network (LAN), a wide area network (WAN), a cable network, and other like communication systems. The network 14 may also include or be in communication with a telecommunications network, such as a local telephone network, long distance telephone network, cellular telephone network, satellite communications network, cable television network and other like communications systems. Furthermore, the network 14 may include or be in communication with more than one network and may include a plurality of different types of networks. Thus, the network 14 may include or be in communication with a plurality of data networks, a plurality of telecommunications networks, a combination of data and telecommunications networks and other like communication systems.

The exemplary communication network can additionally include devices, which are coupled to the network via a wired connection, like a personal computer. For example, the personal computer can be coupled to the network via a dial-up modem or a cable modem connection. Additionally coupled to the network are various servers, which supply various types of information, such as web pages, internet address to domain name translations, and the like. In some instances, the servers supply user accessible content, which is of direct interest to the user. In other instances, the servers supply information, which is useful in managing the operation of the network.

In at least one embodiment of the present invention, a presence attribute information server 22 is provided. In the illustrated embodiment, the server 22 is coupled to the network via a wired connection, however, it is also possible for the server to support a wireless connection to the network. The presence attribute information server supports data structures 24 and 25, which include user presence attribute information for one or more users in the form of one or more presence attribute information entries. The data structures 24 and 25 further include one or more access authorization information entries, which are generally associated with corresponding presence attribute information entries.

Generally, the presence attribute information entry includes the name or type of presence attribute that the entry corresponds to, and a value for the type of presence attribute. In accordance with at least one embodiment, the presence attribute information entry additionally includes a validity period field. The validity period defines the time period during which the value of the presence attribute is valid. This enables a user to have a higher degree of confidence in the information that is received, and/or can be used by the network to make decisions concerning the management of the presence attribute information. Generally, presence information can be either provided through manual entry by a user, or can be generated periodically, by the network without the requirement of manual intervention. In at least some instances, a validity period field will have more applicability relative to presence values that are manually provided, or in instances where communication with the network is intermittent.

As noted above, presence attribute information has been previously used in association with at least instant messaging type services, and has potential applicability to other network services. The presence attribute information provides information as to a user's relationship relative to a communication network 14. However in some instances, it might not be desirable to make the information, generally available. The information can sometimes be private, or a user may not want the information to be generally known. Consequently, in some instances, it may be desirable to limit access to the information, and/or define the circumstances in which the information is restricted. In at least some instances, express authority or permission to access the information may be required. In other instances, authority to access the information may generally be assumed, unless access is specifically restricted. It may also be desirable to limit the level of detail of the information that is available.

While, in some instances, it may be practical and/or desirable to maintain the presence attribute information, centrally, as part of a presence attribute information server, in other instances, it may be desirable to maintain the information as part of a presence attribute information manager application, which is executed as part of an individual user's device.

Figure 2:
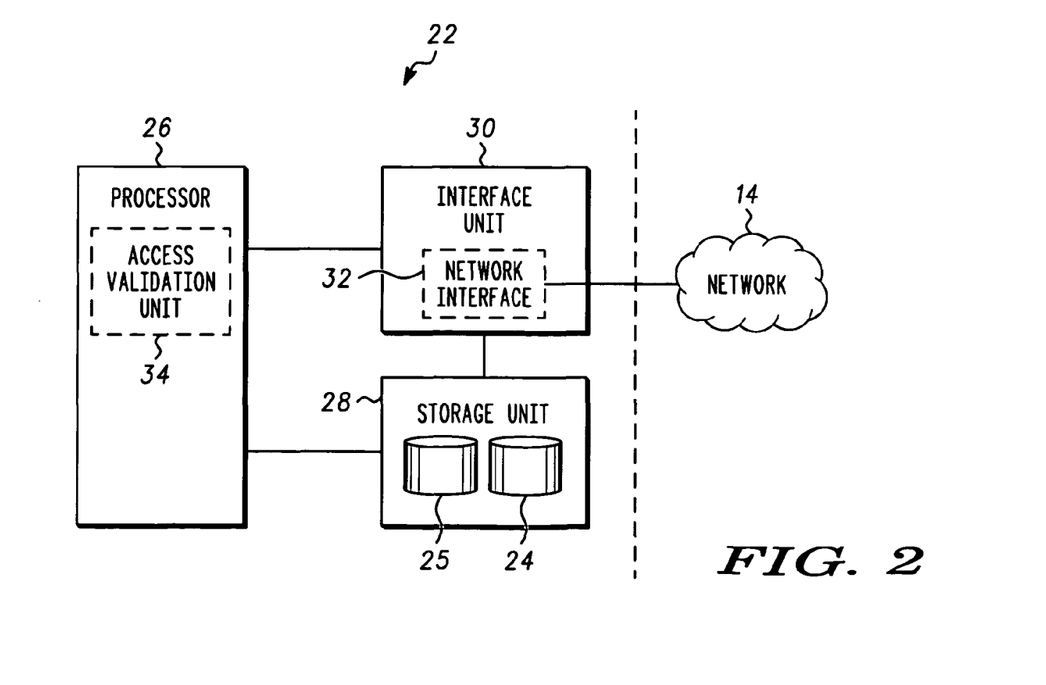
FIG. 2 is a block diagram of a presence attribute information server, in accordance with at least one embodiment of the present invention.

FIG. 2 illustrates a block diagram of a presence attribute information server 22. The presence attribute information server 22 includes a processor 26, a storage unit 28, and an interface unit 30. The storage unit 28 includes data structures 24 and 25, which respectively include user presence attribute information for one or more users in the form of one or more presence attribute information entries, and access authorization information in the form of one or more access authorization information entries, which are associated with various presence attribute information entries. The storage unit could include both volatile and non-volatile forms of memory, many types of which are well known. One such example includes a fixed drive or hard drive, which commonly stores information magnetically. However any form of data storage may be suitable, so long as it supports the ability to one or more of store, update and retrieve the information in the data structure.

In the illustrated embodiment, the storage unit is coupled to both the processor 26 and the interface unit 30. By being coupled directly to the interface unit, it is possible for inquiries to be made of the data stored in the storage unit, which could be accomplished using a form of direct access, without placing any substantial additional burden on the processor 26. However, it is also possible, in one or more alternative embodiments, for the data access to be generally facilitated with varying degrees of involvement by the processor 26.

In the illustrated embodiment, the interface unit 30 includes a network interface 32, which facilitates communication of the server 22 with the network 14.

The processor 26 includes at least an access validation unit 34, which in connection with the illustrated embodiment, can be in the form of one or more sets of prestored instructions, which are executed by the processor. The access validation unit 34 interfaces with the storage module 28, and retrieves corresponding access authorization information from the storage unit 28, in response to receiving a request for presence attribute information. The access validation unit 34 then determines the nature of the conditions that must be present in order for the user requesting presence information to be given authority to receive the information. The access validation unit 34, then determines the relevant present circumstances including possibly the current time or date, and/or the location of the unit whose presence information is being requested or the location of the unit requesting the information. In determining whether a particular access authorization information entry associated with a particular presence attribute entry is of interest, a comparison can be made between the identity of the unit requesting the information, and the identity of the units associated with the particular relevant access authorization information entry.

In the case of determining the current time and date, a calendar and/or clock could be maintained by the access validation unit 34, or alternatively the information can be obtained through another source, for example via the network. In the case of the location of either the unit whose presence information is being requested or the location of the unit requesting the information, this information may be available from the presence information already contained in the storage unit 28, or the information can be separately gathered and/or determined through various location determining techniques. Presumably, information that is not needed for determining the satisfaction of one of the conditions for accessing the information would not need to be gathered by the access validation unit 34.

The access validation unit 34 can then determine whether the unit requesting the information is authorized to access the information. If appropriate, the presence attribute information server can then release the information, or alternatively authorize another source of the presence information to release the information. In some instances, satisfying a condition associated with a relevant access authorization information entry can expressly authorize access to the presence information. In other instances, satisfying an associated condition can expressly prohibit access to the information.

Figure 3:
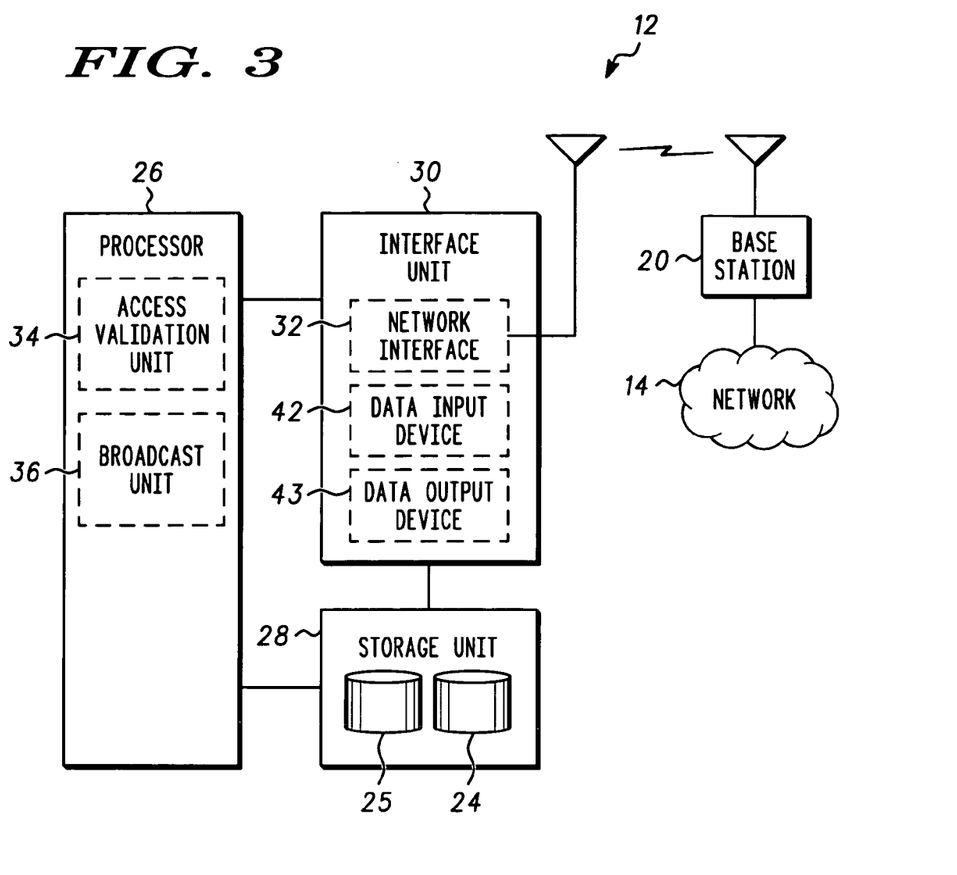
FIG. 3 is a block diagram of a presence attribute information manager application incorporated as part of a user device, in accordance with at least one aspect of the present invention.

FIG. 3 illustrates a block diagram of a presence attribute information manager application, which is executed as part of an individual user's device. In this instance, it is possible that the individual user's device may function like a server, and gather and provide presence attribute information for multiple users. However it is also possible that the individual user's device is only interested in maintaining its own presence attribute information, and forwards the same to a server for general access to the information by other users.

In at least one embodiment, the user's device is executing a presence attribute information manager application. Several of the functions performed by the presence attribute information manager application are similar to functions already described in connection with FIG. 2 and the presence attribute information server 22. In addition to performing several functions, which are similar to the functions performed by the presence attribute information server 22, the user device 12 additionally receives presence attribute information and/or entry of access authorization information directly from the user. In order to accommodate direct entry of presence attribute information, the user's device, illustrated in FIG. 3, includes an interface unit 30 that includes a data input device 42. The data input device 42 could include any standard form of input such as a keypad or a touch sensitive screen (not shown). In other instances, the data input device could include a mouse or a microphone. One skilled in the art will recognize that other data input devices are also possible, without departing from the teachings of the present invention.

In connection with receiving the information from the user, in at least some embodiments, the user device 12 additionally includes a data output device 43. The data output device could make available to the user a suitable interface, such as a graphical user interface, which may assist the user in the encoding and entry of the desired information. One skilled in the art will readily recognize that several forms exist for presenting information to a user, any one of which could be used in conjunction with the present invention without departing from the present teachings.

Additionally, the processor includes a broadcast unit, which similar to the access validation unit, could be implemented as one or more sets of prestored instructions, which are executed by the processor 26. In at least the illustrated embodiment, upon receiving updated information from the user, the information can be supplied to a server, such as the type of server 22 illustrated in FIG. 2, or alternatively could be communicated to units, which have been determined to have authority to receive the information. Still further, where the information received from the user represents a modification of the conditions in which other units will receive authority to access the units presence information, the broadcast unit 36 can trigger a re-determination of the authority of other units to access the information, which may have previously been granted or denied authority to access the presence information.

In the embodiment illustrated in FIG. 3, the user device is a wireless communication device 12, such as a cellular telephone. In this instance, the device could couple to the network 14, via a base station 20, via a wireless communication channel.

While the present invention has generally been described in association with a wireless communication device, like a cell phone, radiotelephone, or a cordless telephone, one skilled in the art will readily recognize that the invention is suitable for use with other types of devices, where it would be beneficial to manage and/or maintain user presence attribute information. A couple of additional examples of other types of devices, where the use of the present invention would be suitable include paging devices, personal digital assistants, portable computers, pen-based or keyboard-based handheld devices, remote control units, an audio player (such as an MP3 player) and the like.

Figure 4:
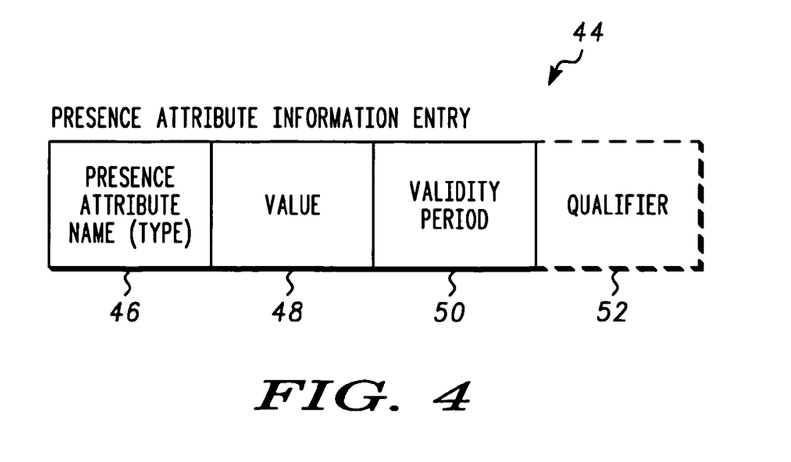
FIG. 4 is a diagram of a presence attribute information entry, which forms at least part of a data structure maintained by either the presence attribute information server, illustrated in FIG. 2, or a presence attribute information manager application, illustrated in FIG. 3.

FIG. 4 illustrates at least one embodiment of a presence attribute information entry 44. In the illustrated embodiment, the presence attribute information entry 44 includes a presence attribute name or type 46, a presence attribute value 48, and a presence attribute validity period 50. The presence attribute name could identify any one of several predefined types of presence attribute information including a user's geographical location, a user's on-line status and a user's availability. Other types of presence attribute information are additionally possible. Depending on the type of presence attribute information, the value field 48 may include different subsets of various types of value information.

A validity period 50 can be a time value, which defines the point in time when the information contained within the presence attribute value field 48 is no longer current. Alternatively, the validity period 50 can include a validity duration. Where a validity duration is identified, it may be additionally beneficial to identify when the presence attribute value field was last changed relative to the specific validity duration. A duration value could be stored as a number of seconds, a number of minutes, a number of hours, etc., or any combination thereof. In this instance, a time value identifying the point in time, when the presence attribute information is no longer valid can be determined by adding the validity duration to the time that the corresponding presence attribute was last set.

The presence attribute information entry 44 could also include a qualifier 52, which might operate as a flag as to the continued validity of the presence attribute information entry. This would allow an entry for a presence attribute information entry, which has lapsed, to be preserved, while still identifying the present attribute as having lapsed. This reduces the risk that the lapsed presence attribute would be erroneously identified as corresponding to current presence attribute information. In this way a history of past values or in some instances a most recent previous value can be preserved.

Figure 5:
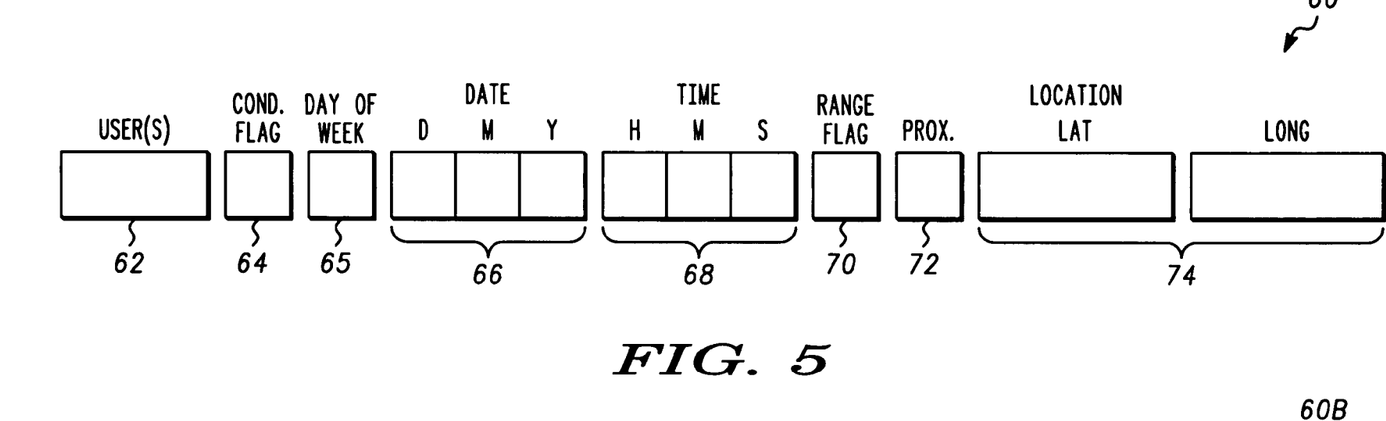
FIG. 5 is a diagram of an access authorization information entry, which forms part of a data structure maintained by either the presence attribute information server, illustrated in FIG. 2, or a presence attribute information manager application, illustrated in FIG. 3, in accordance with at least one embodiment.

As noted above, each presence attribute information entry 44 can be associated with one or more associated access authorization information entries 60. Each access authorization information entry 60 can be selectively associated with one or more users, which can be identified in a user(s) field 62. Furthermore the entry 60 can either expressly authorize access, or expressly deny access, which could be identified by either clearing or setting a condition flag 64. In the illustrated embodiment, the access authorization information entry 60 additionally includes day of week 65, date 66 and time 68 fields. In each instance a combination of entries in the particular sub-fields can identify either a specific day of week, date or time, or alternatively a range could be supplied in one or more of the sub-fields.

In other instances, the use of only some of the sub-field may be desirable and/or necessary for specifying a desired period of time. For example, if one wanted to specify any time Monday through Friday, one might put a range of Monday-to-Friday in the day of week sub-field 65, and leave blank or specifically identify a wild card or don't care value for the other time 68 and date 66 related sub-fields. If one wanted to specify only certain hours during Monday through Friday, a user might additionally specify the hours 9 am-to-5 pm in the hour sub-field. However, if wildcards were used in the minutes and seconds sub-field, in at least one embodiment, this could include times of day between 9 am and 5:59:59 pm. One solution might be to reclassify the hours as being 9 am-to-4 pm, which would end just shy of the desired end time of 5 pm.

Figure 6:
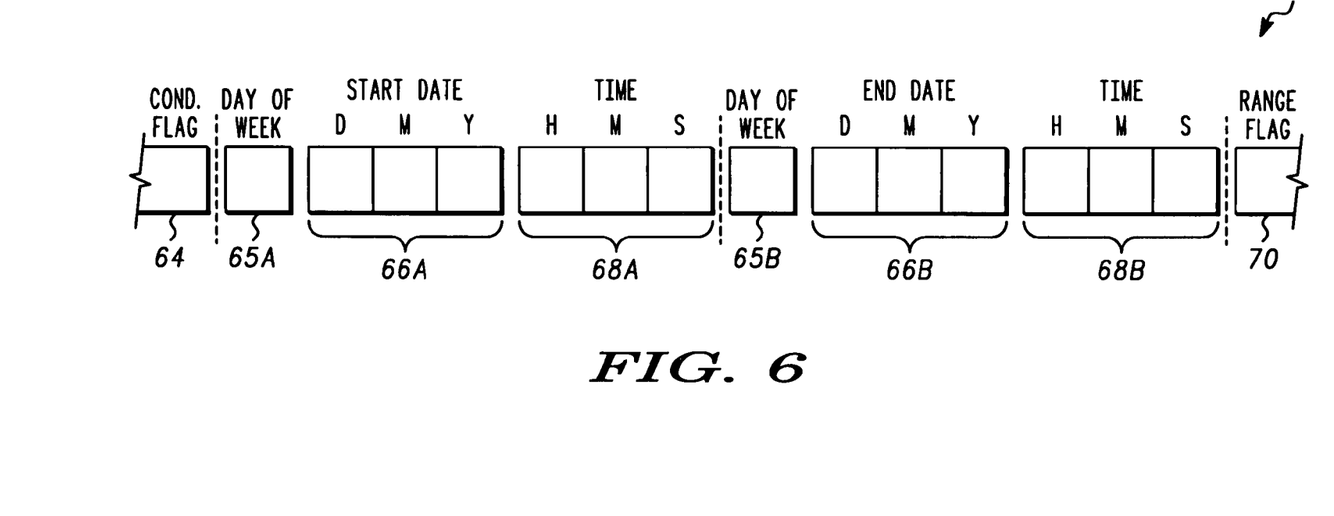
FIG. 6 is a diagram of an alternative embodiment of an access authorization information entry, which includes both start date and end date fields.

In an alternate embodiment, illustrated in FIG. 6, the access authorization information entry 60B includes separate start day/date/time entry sub-fields 65A, 66A and 68A, and end day/date/time entry sub-fields 65B, 66B and 68B, which create alternative possibilities for defining a time range. Still further multiple entries could be used to identify different time periods, that more closely match the desired times during which access may be specifically authorized or precluded.

The access authorization information entries 60 and 60B, additionally include several sub-fields associated with defining a proximity relative to a predetermined location. For example, sub-fields including latitude and longitude 74 could define a location on the surface of the earth. Furthermore proximity field 72 could define an area within a certain distance away from the location defined in sub-field 74. A range modifier or flag 70 could then be used to define the space greater than ">", less than "<" or equal to "=" with respect to the proximity range relative to a defined location. Wildcards could similarly be used in conjunction with some or all of the sub-fields relative to location.

In the event that there are mutually exclusive conditions, where for example one access authorization entry expressly authorizes access and another access authorization entry expressly precludes access, a set of conflict rules could be used to resolve the inconsistency. For example, the conflict rules may preferably include a default of non-access. Alternatively, the later entered access authorization entry may take precedence, in which case a date stamp for each entry may need to be maintained. One skilled in the art will readily recognize that further conflict resolution protocols and or rules could be established without departing from the teachings of the present invention.

Further, additional information could further be encoded in any given access authorization information entry. For example a field could be defined which indicates that the user whose presence information is being requested, should be prompted to manually confirm authority to receive presence information when another user requests the information. After authority is confirmed, or as part of confirming authority, a duration associated with the authorization could be set. This could include an expressly selected duration or a default duration.

Still further the access authorization information entry 60 and 60B could be encoded to identify the formatting of the presence information that is supplied to a particular user requesting the information or a particular type of uses. For example, a location could be provided in terms of a street address or building name, or a coordinate, such as latitude and longitude, could be provided, dependent upon the nature of the recipient.

Figure 7:
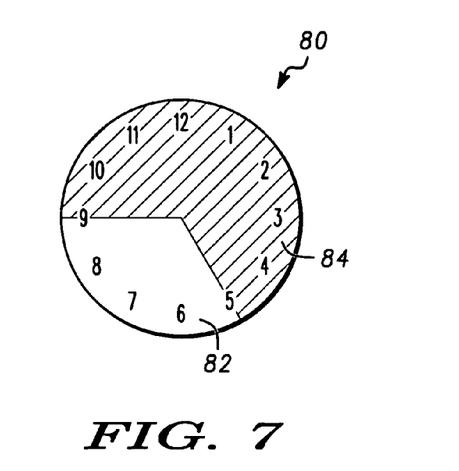
FIG. 7 is a diagram of an exemplary graphical user interface associated with selecting a time value.
Figure 8:
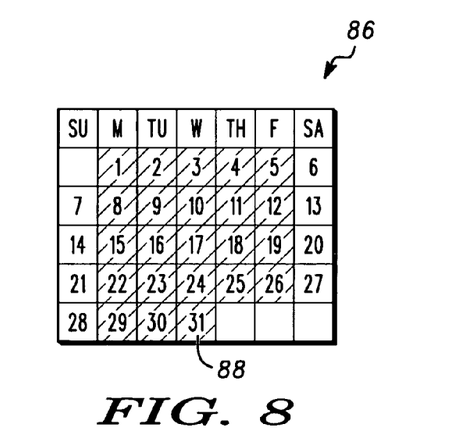
FIG. 8 is a diagram of an exemplary graphical user interface associated with selecting one or more dates and/or days of the week.
Figure 9:
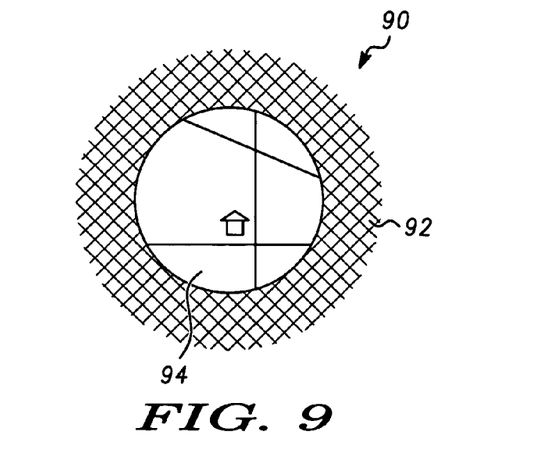
FIG. 9 is a diagram of an exemplary graphical user interface associated with selecting a proximity relative to a location.

FIGS. 7-9 illustrate several examples of diagrams of exemplary graphical user interfaces associated with selecting different types of possible triggering conditions. More specifically, FIG. 7 illustrates an exemplary graphical user interface 80 associated with selecting a time value, where shaded portion 84 may represent a desired time period and un-shaded portion 82 represents an undesired time period. FIG. 8 illustrates an exemplary graphical user interface 86 associated with selecting one or more dates and/or days of the week. In the illustrated example, a shaded section 88 could correspond to the desired days, in which access to the proximity information should be authorized. FIG. 9 illustrates an exemplary graphical user interface 90 associated with selecting a proximity relative to a location. In the illustrated example, a shaded portion 92 could correspond to an area in which access to the proximity information is expressly excluded. Alternatively, un-shaded portion section 94 could correspond to a section in which access to proximity information is expressly included.

In each instance, the graphical user interface is meant to allow an alternative method of defining a triggering condition, which could be used to either expressly allow or expressly disallow access to the presence information in connection with different sets of circumstances. In each instance, the graphical representation is intended to be iconic. Namely, that the graphical representations correspond to forms, that are likely to be familiar to the user, for defining the various types of triggering conditions, that might be desired and selected.

Figure 10:
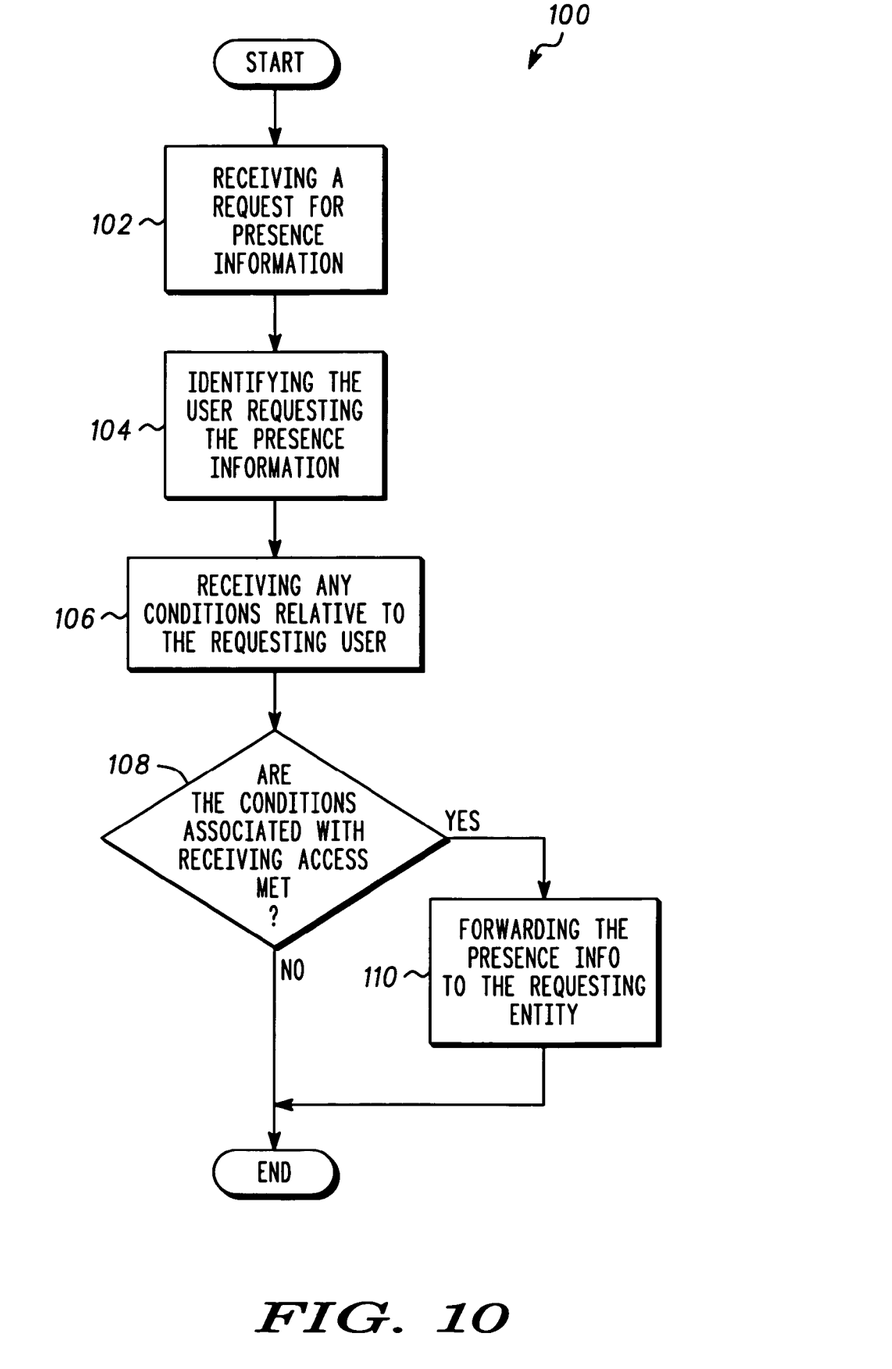
FIG. 10 is a flow diagram for a method for managing the access to presence attribute information, in accordance with at least one embodiment of the present invention.

FIG. 10 illustrates a flow diagram 100 of a method for managing the access to presence attribute information. The method 100 includes receiving 102 a request for presence information. The user requesting the information is then identified 104. A determination is then made as to whether the user is authorized to have access to the requested presence information. The determination includes receiving 106 any conditions relative to the requesting user, which are associated with defining the conditions of access to the requested information. A determination 108 is then made, as to whether the conditions associated with receiving authorization for access have been met. If the user has met the conditions associated with receiving authority for access, the presence information is then forwarded 110 to the user requesting the information.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A presence attribute information server comprising:
a processor;
an interface unit, coupled to the processor, including a network interface for receiving and transmitting user presence attribute information; and
a storage unit, coupled to the interface unit and the processor, including user presence attribute information and associated access authorization information organized and arranged as one or more entries in a data structure;
wherein said access authorization entries are each associated with corresponding user presence attribute information entries, each user presence attribute information entry having a presence attribute value field, corresponding to one or more types of presence attributes, and each access authorization information entry having a user field identifying one or more users and one or more access condition entries, wherein the access condition entries define the conditions when the corresponding user presence attribute information is available to the corresponding identified one or more users.

2. A presence attribute information server in accordance with claim 1 wherein at least one of the one or more access condition entries includes a predetermined period of time to be matched.

3. A presence attribute information server in accordance with claim 2 wherein the predetermined period of time includes a time of day.

4. A presence attribute information server in accordance with claim 2 wherein the predetermined period of time includes a day of the week.

5. A presence attribute information server in accordance with claim 2 wherein a predetermined period of time includes a point in time identifying the beginning of the predetermined period and a point in time identifying the end of the predetermined period.

6. A presence attribute information server in accordance with claim 1 wherein at least one of the one or more access condition entries includes a proximity relative to a predetermined location.

7. A presence attribute information server in accordance with claim 6 wherein the predetermined location includes a specific place.

8. A presence attribute information server in accordance with claim 6 wherein the predetermined location is the present position of at least one of another item or person.

9. A presence attribute information server in accordance with claim 6 wherein the proximity corresponds to a predetermined distance.

10. A presence attribute information server in accordance with claim 6 wherein the location is relative to the at least one of item or person associated with the user presence attribute information.

11. A presence attribute information server in accordance with claim 6 wherein the location is relative to the user requesting the user presence attribute information.

12. A presence attribute information server in accordance with claim 1 wherein the access condition entries include a flag which, when an access condition is met, identifies whether access to the associated user presence attribute information is authorized or precluded.

13. A presence attribute information server in accordance with claim 1 further comprising an access validation unit, coupled to the interface unit and the storage unit, the access validation unit being adapted for receiving from a user a request for user presence attribute information associated with at least one of a particular item or a particular person, receiving one or more of status information of the user requesting the user presence attribute information, status information of the at least one of the particular item or the particular person associated with the requested user presence attribute information, and a current time and date, comparing the one or more of the status information of the user requesting the user presence attribute information, the status information of the at least one of the particular item or the particular person associated with the requested user presence attribute information, and the current time and date to the one or more corresponding access authorization entries associated with the requested user presence attribute information to determine if appropriate access conditions have been met, and authorizing access to the requested user presence attribute information, if the comparison indicates that the appropriate access conditions have been met.

14. A presence attribute information server in accordance with claim 13 wherein the access validation unit includes a set of prestored instructions for execution by the processor.

15. A presence attribute information manager application comprising:

a processor;

an interface unit, coupled to the processor, including a data input device for receiving user presence attribute information from the user and a network interface for transmitting user presence attribute information;

a storage unit, coupled to the interface unit and the processor, including user presence attribute information and associated access authorization information organized and arranged as one or more entries in a data structure;

wherein said access authorization entries are each associated with corresponding user presence attribute information entries, each user presence attribute information entry having a presence attribute value field, corresponding to one or more types of presence attributes, and each access authorization information entry having a user field identifying one or more users and one or more access condition entries, wherein the access condition entries define the conditions when the corresponding user presence attribute information is available to the corresponding identified users.

16. A presence attribute information manager application in accordance with claim 15 wherein said interface unit is further adapted for receiving access conditions associated with one or more users, which are used to formulate access authorization information entries.

17. A presence attribute information manager application in accordance with claim 15 wherein said interface unit further includes a data output device for presenting conditions associated with authorizing access in an iconic format.

18. A presence attribute information manager application in accordance with claim 17 wherein said data input device is further adapted for modifying the conditions being presented by the data output device associated with authorizing access to user presence attribute information associated with one or more users.

19. A presence attribute information manager application in accordance with claim 15 further comprising a broadcast unit, coupled to the interface unit and the storage unit, the broadcast unit being adapted to transmit updated user presence attribute information to at least one of a presence attribute information server and subscribed users, that are currently authorized to receive updates, when the user presence attribute information changes.

20. A presence attribute information manager application in accordance with claim 19 wherein the broadcast unit includes a set of prestored instructions for execution by the processor.

21. A presence attribute information manager application in accordance with claim 15 wherein the presence attribute information manager application is incorporated as part of a portable electronic device.

22. A presence attribute information manager application in accordance with claim 21 wherein the portable electronic device is a wireless radio frequency telephone.

* * * * *